United States Patent Office 3,274,186
Patented Sept. 20, 1966

3,274,186
DERIVATIVES OF CEPHALOSPORIN C AND THEIR SYNTHESIS
Michael Derek Barker, Barnet, and Gordon Alan Somerfield, Beaconsfield, England, assignors to Glaxo Laboratories Limited, Greenford, England, a British company
No Drawing. Filed July 5, 1963, Ser. No. 293,171
Claims priority, application Great Britain, July 11, 1962, 26,675/62
19 Claims. (Cl. 260—243)

This invention is concerned with improvements in or relating to derivatives of cephalosporin C.

The constitution of cephalosporin C has been interpreted in terms of the following structure:

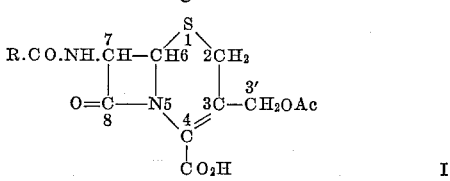

where $R = -(CH_2)_3 \cdot CH(NH_2)COOH$ and consequently the structure of the novel derivatives described below is presented in an analogous fashion.

In Cox et al. application No. 193,015 filed May 7, 1962, novel derivatives of cephalosporin C are described having the general formula:

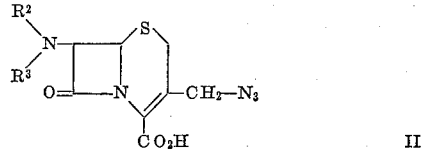

(in which $R^2$ and $R^3$ are each hydrogen atoms or $R^2$ is a hydrogen atom and $R^3$ is an acyl group or a triaryl substituted alkyl group or $R^2$ and $R^3$ together form a divalent acyl group derived from a dicarboxylic acid) together with salts thereof, the derivatives possessing the advantages stated therein.

We have now found that compounds of general Formula II may be reduced so that the azido group is converted to an amino group, many of the resulting novel amines having antibacterial activity.

According to the invention, therefore, we provide as new compounds, compounds of the general formula:

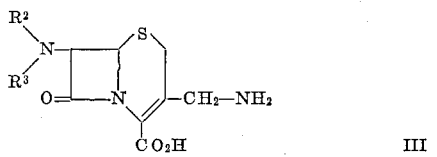

(in which $R^2$ and $R^3$ have the above defined meanings) and salts thereof.

It should be appreciated that compounds of general Formula III normally exist as Zwitterions.

The compounds according to the invention will in general have antibacterial activity when at least one acyl group is present on the amine group in the 7-position. Compounds according to the invention possessing antibacterial activity have in general the important advantage of improved stability to degradation in vivo (as evidenced, for example, by animal tests) compared with the corresponding acetoxy compounds. Since the latter possess activity against penicillin resistant organisms this is highly important. Compounds according to the invention possessing antibacterial activity are particularly active against gram positive organisms and possess superior solubility characteristics than 7-phenylacetamido-3-thiouroniummethylceph-3-em-4-oic acid described in application No. 193,015.

The cephalosporin compounds of the examples and throughout the specification and claims are named with reference to the ring structure cepham having the formula

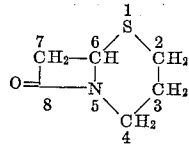

(see J.A.C.S. 84 3400 (1962).

Compounds according to the invention in which the 7-position is occupied by an unsubstituted amino group are useful as intermediates rather than as antibiotics in their own right.

Apart from any antibiotic properties which they may possess, the compounds according to the invention are useful, as a group, as intermediates for the preparation of other cephalosporin derivatives.

Whilst $R^3$ may represent an acyl group in general terms one may use other specific acyl derivatives representative of alkanoyl, alkenoyl, substituted alkanoyl e.g. aralkanoyl, aryloxyalkanoyl, S-arylthioalkanoyl, S-aralkylthioalkanoyl and heterocyclic-alkanoyl, of cephalosporin derivatives as defined herein. These acyl derivatives may be defined as having the general formulae:

(i) $R'(CH_2)_nCO-$ where $R'$ is aryl, cycloalkyl, substituted aryl, substituted cycloalkyl or heterocyclic and $n$ is an integer from 1-4. Examples of this group include phenylacetyl, nitrophenyl-acetyl and phenylpropionyl.

(ii) $C_nH_{2n+1}CO-$ where $n$ is an integer from 2-7. The alkyl group may be straight or branched and, if desired, may be interrupted by an oxygen or a sulphur atom. Examples of such groups include hexanoyl, heptanoyl, octanoyl and butylthioacetyl.

(iii) $C_nH_{2n-1}CO-$ where $n$ is an integer from 2-7. The alkenyl group may be straight or branched and, if desired, may be interrupted by an oxygen or a sulphur atom. Examples of such groups include acrylyl, crotonyl and allylthioacetyl.

(iv) $R'O\ CR''R'''.CO-$ where $R'$ has the meaning defined under (i) and $R''$ and $R'''$ are the same or are different and each is a hydrogen atom or an alkyl group. An example of such a group is phenoxyacetyl.

(v) $R'SCR''R'''.CO-$ where $R'$, $R''$ and $R'''$ are as defined above. Eamples of such thio groups includes S-phenylthioacetyl, S-chlorophenylthioacetyl and S-bromophenylthioacetyl.

(vi) $R'(CH_2)_mS(CH_2)_nCR''R'''.CO-$ where $R'$, $R''$ and $R'''$ are as defined above, $m$ is an integer from 1-4 and $n$ is 0 or an integer from 1-4. Examples of such a group include S-benzylthioacetyl, benzylthiopropionyl and β-phenethylthioacetyl.

(vii) $R'CO-$ where $R'$ has the meaning defined above. Examples of such groups include benzoyl, substituted benzoyl and cyclopentanoyl. Where the benzoyl group is substituted the substituents may be alkyl or alkoxy and the substituents may be in the 2- or- and 6-positions. A suitable 2,6-disubstituted benzoyl group is, therefore, 2,6-dimethoxy-benzoyl.

The compounds according to the invention are conviently prepared by reduction of the corresponding azide defined in general Formula II. According to a feature of the invention, therefore, there is provided a process for the preparation of compounds of general Formula III which comprises reducing a compound of general Formula II.

The reduction is advantageously effected by catalytic hydrogenation of the azide using a precious metal catalyst. Thus, whilst palladium may be used as the catalyst, platinum has given superior results. The reduction is advantageously effected in the presence of a strong acid, preferably perchloric acid since this enables the reduction to proceed smoothly in relatively good yield. We also prefer to carry out the reduction of the azide when it is dissolved in an inert organic solvent, alcohols being in general suitable for this purpose. Whilst the hydrogenation may be effected under prevailing atmospheric conditions we prefer to effect this under slight pressure e.g. 3–10 atmospheres.

It should be noted that it is not necessary to use the azide in a pure state since any impurities remaining after the preparation of the azide (as, for example, described in application No. 193,015) can be removed when purifying the amine. The amine may be purified first by ion-exchange chromatography and then by crystallisation from a concentrated solution or, preferably, by freeze drying a more dilute solution.

The compounds according to the invention may be converted into other cephalosporin derivatives by subsequent reaction of the 3'-amino group.

The 3'-amino group may, for example, be acylated to form cephalosporin derivatives of the general formula:

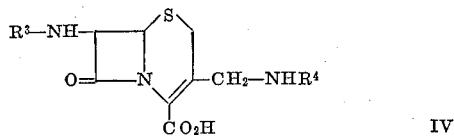

(where $R^3$ has the meaning defined above but is not a hydrogen atom and $R^4$ is an acyl group which may or may not be the same as $R^3$) and salts thereof.

In forming compounds of general Formula IV it is preferred to use a compound of general Formula III in which $R^2$ is a hydrogen atom and $R^3$ is an acyl group unless it is desired that $R^3$ and $R^4$ should be the same acyl groups in which case one may use the 7-amino compound of general Formula III.

The group $R^4$ may be the residue of a mono-or polycarboxylic acid i.e. $R^4$ may contain one or more carboxyl groups where it is derived from a polycarboxylic acid.

The formation of compounds of general formula IV may, for example, be effected by one of the following methods:

(a) Reaction of the compound of general Formula III with an acid chloride, or acid anhydride e.g., in aqueous or organic solution.

(b) Reaction of the compound of general Formula III with a mixture anhydride of an acid corresponding to the desired acyl group and another acid, the mixed anhydride being formed by reaction of the acid corresponding to the desired acyl group with an alkyl haloformate, if desired in situ; the reaction with the mixed anhydride preferably being conducted in solution in an anhydrous, inert solvent in the presence of an acid binding agent e.g. a tertiary amine. The inert solvent is preferably also water-miscible.

(c) Reaction of the compound of general Formula III, e.g. as a sodium salt with a free acid corresponding to the desired acyl group and a carbodiimide of the general formula:

$$R^5N{:}C{:}NR^6 \qquad V$$

where $R^5$ and $R^6$ are the same or are different and each represents an alkyl, cycloalkyl, aryl or aralkyl group, preferably in an inert solvent e.g. aqueous tetrahydrofuran. N,N'-dicyclohexylcarbodiimide is the preferred carbodiimide in view of the fact that it forms dicyclohexylurea which can readily be separated from the reaction mixture.

Acids, or functional derivatives thereof, which can be used to form derivatives of general Formula IV include, in addition to the various acids corresponding to $R^3$, heterocyclic carboxylic acids e.g. nicotinic acid; alkyl or aryl carbonic acids e.g. ethyl carbonic acid; substituted phosphorus acids e.g. dibenzylphosphorus acid; sulphonic acids e.g. p-toluene sulphonic acid; carbonic acids and dicarboxylic acids.

The 3'-amino group may also be reacted with a substituted isocyanate or isothiocyanate to yield urea or thiourea derivatives respectively corresponding to the general formula:

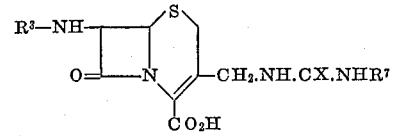

in which $R^3$ has the above defined meaning, X is an oxygen or sulphur atom and $R^7$ is an aliphatic, aryl or araliphatic group and salts thereof.

Compounds of general Formula VI can also be obtained by reaction with a corresponding N-substituted carbamyl halide.

In order that the invention may be well understood the following examples are given by way of illustration only. In the examples the following testing and experimental procedure was followed.

*Paper chromatography*

*Phosphate buffered papers.*—Anhydrous disodium hydrogen phosphate (7.05 g.) in water (2.5 litres; 0.02 M) was adjusted to pH 6 with phosphoric acid; Whatman No. 1 papers (30 x 50 cm.) were dipped into the above solution and dried at 37° overnight.

*Sodium acetate buffered papers.*—Hydrated sodium acetate 13.6 g. in water (1 litre; 0.1 M) was adjusted to pH 5 with acetic acid; Whatman No. 1 papers (30 x 30 cm.) were dipped into the above solution and dried.

Paper chromatograms were run on phosphate-buffered paper in (A) butan-1-ol-ethanol-water (B.E.W.) (4:1:5; by volume) and (B) Propan-1-ol-water (7:3 by volume) also on sodium acetate buffered papers in ethyl acetate-sodium acetate solvent system (ethyl acetate saturated with sodium acetate buffer pH 5.0).

*Electrophoresis.*—Electrophoresis was carried out on Whatman 3MM paper at 17 v./cm. (for 2.5–4 hours, unless stated otherwise) in aqueous collidine acetate solution (0.05 M to acetate) pH 7.0 and pyridine acetate solution (0.05 M to acetate) pH 4.0.

Electrophoresis results are expressed as distance travelled by derivative relative to that travelled by 7-phenylacetamidoceph-3-em-4-oic acid (7-PACA) under the same conditions. A positive (+) value implies migration towards anode i.e. molecule is negatively charged whereas a negative (−) value indicates migration towards cathode i.e. positively charged.

Members of the 7-phenylacetamidoceph-3-em-4-oic acid family were seen as dark spots when the paper was placed before a source of ultra-violet light (λ230–300 mμ). They were also detected by means of bioautographs on agar plates inoculated with *S. aureus* C864 (Oxford H strain) or *S. aureus* 604.

EXAMPLE 1

(a) *3 - Azidomethyl-7-phenylacetamidoceph-3-em-4-oic acid.*—Sodium 7-phenylacetamidoceph-3-em-4-oate (2.00 g.) and sodium azide (0.7 g.) in water (25 ml.) were incubated for 16 hours at 50°. The reaction solution was then acidified and extracted with ethyl acetate which on evaporation yielded a brown solid (1.76 g.). This solid was purified by counter-current extraction using the solvent system ethyl acetate/0.2 M. sodium acetate-acetic acid buffer (pH 4.4). Fractions containing the required product were combined and evaporated to yield a solid (1.31 g.). Treatment with sodium 2-ethyl-hexanoate in acetone gave the sodium salt λ max. 262 mμ, $E_{1\ cm.}^{1\%}$ 217 (water)

The I.R. spectrum showed a strong peak at 2100 cm.$^{-1}$ consistent with the presence of an azido group.

Chromatography:
B.E.W., $R_{7\ PACA}$ ---------------------- 1.1
EtOAc, $R_{7\ PACA}$ ---------------------- 2.0

Electrophoresis:
pH 4, $M_{7\ PACA}$ ---------------------- +1.0
pH 7, $M_{7\ PACA}$ ---------------------- +1.0

(b) *3 - Aminomethyl-7-phenylacetamidoceph-3-em-4-oic acid.*—A solution of 3-azidomethyl-7-phenylacetamidoceph-3-em-4-oic acid (200 mg.) and perchloric acid (60%, 2 drops) in ethanol (20 ml.) was hydrogenated at 5 atmospheres pressure with Adam's catalyst (150 mg.) for 6 hr. Water (25 ml.) was added and the solution concentrated under reduced pressure to one-third its original volume. The catalyst was separated and the resultant solution passed through a column of Dowex-1 ion-exchange resin (Acetate form). The column was eluted with water and the eluant (100 ml.) was concentrated to a small volume. This concentrated solution was freeze-dried to yield 3-aminomethyl-7-phenylacetamidoceph-3-em-4-oic acid as an almost colorless powder $\lambda$ max., 258 m$\mu$ $E_{1\ cm.}^{1\%}$ 205

Chromatography:
B.E.W., $R_{7\ PACA}$ ---------------------- 0.7
EtOAc, $R_{7\ PACA}$ ---------------------- 0.0

Electrophoresis:
pH 4, $M_{7PACA}$ ----------------------0.0
pH 7, $M_{7PACA}$ ---------------------- 0.0

Following the procedure of Example 1 a number of the 3-aminomethyl substituted 7-acylamidoceph-3-em-4-oic acids were prepared. The results are shown in Table I.

TABLE I

| Ex. No. | 7-substituent | Chromatography $R_{7\ PACA}$ B.E.W. |
|---|---|---|
| 2 | Pentanamido | 0.67 |
| 3 | S-benzylthioacetamido | 0.88 |
| 4 | 2-thienylacetamido | 0.55 |
| 5 | p-Methoxyphenylacetamido | 0.68 |
| 6 | Methylthioacetamido | 0.25 |
| 7 | Ethylthioacetamido | 0.50 |
| 8 | Isopropylthioacetamido | 0.65 |

EXAMPLE 9

*7-phenylacetamido-3-phenylacetamidomethylceph-3-em-4-oic acid*

(a) A solution of phenylacetyl chloride (0.4 ml.) in acetone (5 ml.) was slowly added at 0° to a stirred solution of the amine (400 mg.) of Example 1(b) in aqueous acetone (1:1 by vol.; 20 ml.) N—NaHCO$_3$ solution (5 ml.). The mixture was stirred at 0° for 30 min. and at room temperature for a further 30 min. Further small quantities of NaHCO$_3$ solution were added during the reaction so that the pH of the solution did not fall below pH 7. The acetone was evaporated and the solution adjusted to pH 3.2 with hydrochloric acid. This solution was extracted with benzene (4×20 ml.); the pH of the solution was readjusted to pH 3.2 before each extraction, the pH lowered to 2.5 and then extracted with ethyl acetate (4×20 ml.). The dried ethyl acetate solution was evaporated and the residual brown froth (358 mg.) dissolved in acetone (3 ml.). After evaporation at room temperature for 20 hours, the phenylacetyl derivative of the amine was obtained as colourless prisms (147 mg.), decomp. >192° $\lambda$max.=258 and 262 m$\mu$ $E_{1\ cm.}^{1\%}$=216 and 216 respectively Chromatography:
B.E.W., $R_{7\ PACA}$ ---------------------- 1.2
EtOAc, $R_{7\ PACA}$ ---------------------- 1.5

Electrophoresis:
pH 4, $M_{7\ PACA}$ ---------------------- +0.90
pH 7, $M_{7\ PACA}$ ---------------------- +0.90

(b) A solution of the amine (400 mg.) of Example 1(b) in tetrahydrofuran (10 ml.) and N/10 sodium hydroxide solution (10.5 ml.) was treated with a solution of phenylacetic acid (180 mg.) and dicyclohexylcarbodiimide (273 mg.) in tetrahydrofuran (20 ml.) and the mixture shaken at room temperature for 3 hr. Water (200 ml.) was then added and the aqueous solution acidified and extracted with ethyl acetate. The dried ethyl acetate solution was evaporated to yield an oily solid (464 mg.) which was leached with acetone (5 ml.) to leave a colourless solid which was not biologically active. No crystals were obtained on slow evaporation of the acetone solution at room temperature. Paper chromatography showed that the acetone solution contained predominantly the phenylacetylated amine.

(c) Ethyl chloroformate (0.10 ml.) was added at 0–5° to a solution of phenylacetic acid (150 mg.) and triethylamine (0.15 ml.) in acetone (10 ml.) and the mixture stirred in the cold for 30 min. At the end of this time, a solution of the amine (400 mg.) of Example 1(b) and triethylamine (0.15 ml.) in water (10 ml.) and dioxan (20 ml.) was added and the stirring continued for a further 15 min. at 0–5° and then for 2 hr. at room temperature. Water (100 ml.) was added, the solution acidified and extracted with ethyl acetate. The dried ethyl acetate solution was evaporated to yield a brown oil (220 mg.) which did not crystallise when its solution in acetone (5 ml.) was evaporated slowly at room temperature. Paper chromatography showed that the acetone solution contained predominantly the phenylacetylated amine.

EXAMPLE 10

*3-acetamidomethyl-7-phenylacetamidoceph-3-em-4-oic acid*

A solution of the amine (500 mg.) of Example 1(b) in water (20 ml.), acetone (20 ml.) and N—NaHCO$_3$ solution (10 ml.) was treated dropwise with acetic anhydride (3 ml.) at 0–5° during a period of 15 min. More N—NaHCO$_3$ solution was added as required so that the pH of the reaction mixture was maintained above 7. The mixture was evaporated to remove the acetone, acidified and extracted with ethyl acetate (3×20 ml.). The dried extract was evaporated to yield a brown froth which was dissolved in acetone (3 ml.). Slow evaporation overnight of this solution yielded a colourless solid (206 mg.)

$\lambda$max. 258 m$\mu$ $E_{1\ cm.}^{1\%}$=244

Chromatography, $R_{7\ PACA}$:
B.E.W.=0.86
EtOAc=0.12

Electrophoresis, $M_{7\ PACA}$:
pH 4 and pH 7=+0.90

The infra-red spectrum (Nujol) has major peaks at 3280 (—NH—), 1792 (>C=O, $\beta$—lactam), 2600 and 1708 (—COOH), 1666 and 1543 cm.$^{-1}$ (—CONH—).

EXAMPLE 11

*7-phenylacetamido-3-(2'methylpyridinium) amidomethylceph-3-em-4-oic acid*

Ethyl chloroformate (0.11 ml.) was added to 0–5° to a solution of picolinic acid (154 mg.) and triethylamine (0.18 ml.) in acetone (8 ml.) and the mixture stirred in the cold for 30 min. The filtered solution was added slowly to a cooled (0–5°), stirred solution of the amine (364 mg.) of Example 1(b) and sodium bicarbonate (192 mg.) in water (8 ml.). The mixture was stirred for 15 min. in the cold and for 1 hr. at room temperature. The acetone was evaporated and the aqueous solution acidified and extracted with ethyl acetate. Evaporation of the dried ethyl acetate solution yielded an orange gum which crystallised from methanol (3 ml.) to yield an almost colourless solid (140 mg.)

$\lambda$max. 265 m$\mu$ $E^{1\%}_{1cm.}$ 357

Chromatography, $R_{7\ PACA}$:
 B.E.W.=1.1
 EtOAc=1.1

Electrophoresis, $M_{7\ PAAC}$:
 pH 4=1.0
 pH 7=0.55

EXAMPLE 12

*3-(2′,6′-dimethoxybenzamido) methyl-7-phenyl-acetamidoceph-3-em-4-oic acid*

A solution of 2,6-dimethoxybenzoyl chloride (457 mg.) in chloroform (5 ml.) was added slowly at 0–5° to a stirred suspension of the amine (496 mg.) of Example 1(b) in chloroform (5 ml.) containing triethylamine (0.4 ml.). The mixture was stirred for 30 min. at 0–5° and for a further 30 min. at room temperature. N-hydrochloric acid was added until the aqueous phase had pH equal to 2, and the chloroform layer was then separated. This solution was washed with water (3×20 ml.), dried and evaporated to leave a brown gum. The residue was crystallised from a mixture of ethyl acetate (10 ml.) and ether (10 ml.) to yield a brown solid (131 mg.)

$\lambda$max. 260 m$\mu$ $E^{1\%}_{1cm.}$=202

Chromatography, $R_{7\ PACA}$:
 B.E.W.=1.2
 EtOAc=0.7

EXAMPLE 13

*3-formylaminophenyl-7-phenylacetamidoceph-3-em-4-oic acid*

A solution of the amine (400 mg.) of Example 1(b) in 98% formic acid (10 ml.) and acetic anhydride (5 ml.) was stirred at room temperature for 4 hr. and then water 50 ml.) was added. The solution was evaporated in vacuo and the residual brown solid continuously extracted with acetone for 3 hr. Evaporation of the acetone solution yielded a brown solid (140 mg.)

$\lambda$max. 255 (infl.) m$\mu$ $E^{1\%}_{1cm.}$=160

Chromatography, $R_{7\ PACA}$:
 B.E.W.=2.6
 EtOAc=1.1

Electrophoresis, $M_{7\ PACA}$:
 pH 4=+1.1
 pH 7=+1.0

Following the procedure of Examples 9a, 10, 11 or 12, acyl derivatives of 3-aminomethyl-7-phenylacetamido-ceph-3-em-4-oic acid were prepared from various acids. The results obtained are shown in Table II.

TABLE II

| Ex. No. | Prepd. by method described in Example No. | Acid | Chromatography $R_{7PACA}$ | | Electrophoresis $M_{7PACA}$ | |
|---|---|---|---|---|---|---|
| | | | EtOAc | B.E.W. | pH 4 | pH 7 |
| 14 | 11 | Nicotinic acid | 1.1 | 1.1 | +0.9 | +1.1 |
| 15 | 11 | Isonicotinic acid | 0.17 | 1.1 | | |
| 16 | 9a | S-methylthioacetic acid | 0.50 | 1.0 | | |
| 17 | 11 | Quinaldinic acid | 1.7 | 1.1 | | |
| 18 | 11 | Quinoline-8-carboxylic acid | 1.4 | 1.1 | | |
| 19 | 12 | p-Toluenesulphonic acid | 1.4 | 1.2 | | |
| 20 | 12 | Methylsulphonic acid | 1.6 | 1.1 | | |
| 21 | 9a | Benzenesulphonic acid | 1.9 | 1.2 | | |
| 22 | 9a | Pyridine-3-sulphonic acid | 0.5 | 1.1 | +0.7 | +1.0 |
| 23 | 9a | 3,5-dinitrobenzoic acid | 1.3 | 1.1 | | |
| 24 | 9a | 4-nitrobenzoic acid | 1.2 | 1.2 | | |
| 25 | 9a | Benzyloxyformic acid | 2.3 | 1.2 | +0.6 | +1.1 |
| 26 | 9a | Ethyloxyformic acid | 1.1 | 1.1 | +0.7 | +1.0 |
| 27 | 9a | Benzoic acid | 1.4 | 1.4 | | |
| 28 | 9a | Phenoxyacetic acid | 1.3 | 1.2 | | |
| 29 | 10 | Propionic acid | 0.1 | 1.1 | | |

EXAMPLE 30

Also following the procedure of Example 9a, 7-(2′-thienylacetamido) - 3 - (2″ - thienylacetamido)ceph - 3-em-4-oic acid was prepared. The compound has the following properties:

Chromatogrhpy, $R_{7\ PACA}$:
 B.E.W.=1.2
 EtOAc=0.9

EXAMPLE 31

*Reaction of phthalic anhydride with 3-aminomethyl-7-phenylacetamidoceph-3-em-4-oic acid*

A solution of the amine (50 mg., 0.13 m.mole) in dimethylformamide (5 ml.) was treated at 0° with triethylamine (0.02 ml.) and stirred for 1 hour. Phthalic anhydride (60 mg., 0.39 m.mole) in dimethylformamide (5 ml.) was added at 0° and the mixture stirred for a further 24 hours at 37°. The presence of a new biologically active substance was shown by paper chromatography and electrophoresis for which results are given in Table III below, together with the results obtained for the corresponding 4-chloro and tetraiodo compounds.

TABLE III

| Ex. No. | Compound | Chromatography $R_{7\ PACA}$ | | Electrophoresis $M_{7\ PACA}$ | |
|---|---|---|---|---|---|
| | | EtOAc | B.E.W. | pH 4 | pH 7 |
| 31 | Phthalic anhydride | 2.48 | 1.09 | 0.81 | ca. 0.9 |
| 32 | 4-chlorophthalic anhydride | 3.19 | 1.13 | 0.65 | ca. 0.9 |
| 33 | Tetraiodophthalic anhydride | 3.46 | | | |

EXAMPLE 34

*Reaction of o-methoxyphenylisocyanate with 3-amino-methyl-7-phenylacetamidoceph-3-em-4-oic acid*

The amine (400 mg.; 1.1 m.mole) was stirred with dimethylformamide (10 ml.) and triethylamine (0.2 ml.; 2 m.mole) at 0° for 30 minutes. o-Methoxyphenylisocyanate (0.16 ml.; ca. 1.1 m.mole) was added to the amine which had partly dissolved in the solvent, and the mixture stirred for 15 minutes at 0°, after which time the solution of the amine was complete. The solution was stirred for a further 5 hours at room temperature and then diluted with ether (200 ml.). After 20 hours at 0° C. resultant solid was separated and washed well with ether to yield a yellowish powder (286 mg.).

$\lambda$max. 240, 260 (shoulder) m$\mu$, $E^{1\%}_{1cm.}$ 216, 163

The following table shows the properties of the products of the reaction of the amine with different isocyanates and isothiocyanates:

TABLE IV

| Ex. No. | Compound | Chromatography $R_{7\ PACA}$ | | Electrophoresis $M_{7\ PACA}$ | |
|---|---|---|---|---|---|
| | | EtOAc | B.E.W. | pH 4 | pH 7 |
| 34 | o-Methoxyphenyl isocyanate. | 1.93 | 1.17 | 0.63 | ca. 0.9 |
| 35 | Phenyl isocyanate | 1.47 | 1.21 | 0.60 | ca. 0.9 |
| 36 | p-Methoxyphenyl isocyanate. | 1.13 | 1.17 | 0.64 | ca. 0.9 |
| 37 | Phenyl isothiocyanate. | 1.30 | 1.22 | 0.65 | ca. 0.9 |
| 38 | Allyl isothiocyanate. | 0.79 | 1.15 | 0.79 | ca. 0.9 |
| 39 | Methyl isothiocyanate. | 0.24 | 1.00 | 0.86 | ca. 0.9 |
| 40 | n-Propylisothiocyanate. | 0.78 | 1.07 | | |
| 41 | Isopropylisothiocyanate. | 0.72 | 1.07 | | |
| 42 | n-Butylisothiocyanate. | 1.00 | 1.11 | | |
| 43 | cyclohexylisothiocyanate. | 1.69 | 1.18 | | |

EXAMPLE 44

*Preparation of 3-(2,4-dinitrophenylamino)methyl-7-phenylacetamidoceph-3-em-4-oic acid*

An aqueous solution (11 ml.) of the amine (1 mg.) of Example 1(b) was treated with 2,4-dinitrofluorobenzene (ca. 1 mg.) in ethanol (10 ml.) and with $N$—$NaHCO_3$ solution (0.1 ml.) after 3 hours in the dark, the ethanol was evaporated and the aqueous solution extracted with ether. The residual solution was acidified and extracted with ethyl acetate. Paper chromatography of the ethyl acetate solution in ethyl acetate/sodium acetate system showed the presence of a yellow spot ($B_{7\ pACA}=2.5$) which was active when bioautographed against *S. aureus*.

The biological results obtained are shown in the following table:

| Ex. No. | Tube Dilution Assay ($\gamma$/ml.) | | | | | | | | Yeast | Mouse Protection ($ED^{50}$/ mg./kg./dose) | |
|---|---|---|---|---|---|---|---|---|---|---|---|
| | Gram-positive | | | Gram-negative | | | | | | | |
| | Staph. aureus 604 | Staph. aureus 663 | Staph. aureus 3452 | E. coli 573 | S. typhimurium 804 | Pr. vulgaris 431 | Ps. pyocyanea 150 | | C. albicans C316 | S. aureus 663 (subcutaneous) | E. coli 573 (subcutaneous) |
| 1(b) | 1.25 | 0.16 | C864 | (*) | (*) | (*) | (*) | | (*) | 4 | >25 |
| 2 | >2.5 | 0.6 | 12.5 | (*) | (*) | (*) | (*) | | (*) | 50 | 50 |
| 3 | >2.5 | 0.16 | 6.2 | (*) | (*) | (*) | (*) | | (*) | 15 | >50 |
| 4 | 2.5 | 0.08 | >25 | (*) | (*) | (*) | (*) | | (*) | 50 | >50 |
| 5 | >2.5 | 0.3 | 62.5 | (*) | (*) | 250 | 250 | | (*) | 50 | >50 |
| 6 | 0.08 | 0.04 | 16 | (*) | (*) | (*) | (*) | | (*) | >50 | >50 |
| 7 | 2.5 | 0.32 | 62.5 | (*) | (*) | (*) | (*) | | (*) | >50 | >50 |
| 8 | 1.25 | 0.32 | 31 | (*) | (*) | (*) | (*) | | (*) | >50 | >50 |
| 9 | 1.6 | 0.4 | | (*) | (*) | (*) | (*) | | (*) | 15 | >25 |
| 10 | 2.5 | .62 | | 62 | 62 | 125 | 62 | | 62 | >25 | >25 |
| 11 | 1.25 | 0.3 | 31 | (*) | 250 | 250 | (*) | | (*) | 25 | >50 |
| 12 | >2.5 | 1.25 | 125 | (*) | (*) | (*) | (*) | | (*) | >50 | >50 |
| 13 | 1.25 | 0.63 | 62.5 | (*) | (*) | 250 | (*) | | (*) | | |
| 14 | 2.5 | 0.63 | 250 | (*) | (*) | (*) | (*) | | (*) | >50 | >50 |
| 15 | 2.5 | 0.32 | 250 | (*) | 250 | (*) | 250 | | (*) | >50 | >50 |
| 16 | 2.5 | 0.32 | 250 | (*) | (*) | (*) | 250 | | (*) | >50 | >50 |
| 17 | 2.5 | 0.15 | 62.5 | (*) | (*) | (*) | (*) | | 250 | 15 | >50 |
| 18 | 0.32 | 0.32 | 62.5 | (*) | (*) | (*) | (*) | | (*) | | |
| 19 | >2.5 | 0.6 | 31.0 | 62 | 62 | 125 | 125 | | 32 | 10 | >50 |
| 20 | 2.5 | 1.25 | 31 | (*) | (*) | 250 | 125 | | 125 | 10 | >50 |
| 21 | 0.08 | 0.02 | 125 | (*) | (*) | (*) | (*) | | (*) | | |
| 22 | 1.25 | 1.25 | 62.5 | 125 | (*) | (*) | (*) | | (*) | | |
| 23 | 0.16 | 0.62 | 16.0 | (*) | (*) | (*) | (*) | | (*) | | |
| 24 | 0.31 | 0.01 | 125 | (*) | (*) | (*) | (*) | | (*) | | |
| 25 | >2.5 | 0.16 | 125 | 250 | (*) | (*) | (*) | | (*) | | |
| 26 | 1.25 | 0.32 | 125 | (*) | (*) | (*) | (*) | | (*) | | |
| 27 | 2.5 | 0.16 | | 250 | 250 | 250 | 125 | | 250 | 10 | >50 |
| 28 | >2.5 | 0.16 | | (*) | (*) | (*) | (*) | | (*) | 20 | >50 |
| 29 | 2.5 | 0.31 | | (*) | (*) | 250 | (*) | | (*) | >50 | >50 |
| 30 | 1.25 | 0.16 | | (*) | (*) | (*) | (*) | | (*) | >50 | >50 |
| 31 | 1.25 | 0.16 | 62 | (*) | (*) | (*) | 250 | | (*) | 4 | >50 |
| 32 | 2.5 | 0.3 | 125 | (*) | (*) | (*) | (*) | | (*) | 25 | >50 |
| 33 | >2.5 | >2.5 | (*) | (*) | (*) | (*) | 250 | | (*) | >50 | >50 |
| 34 | >2.5 | 0.31 | | (*) | (*) | (*) | (*) | | (*) | 40 | >50 |
| 35 | 2.5 | 0.6 | 125 | (*) | (*) | (*) | (*) | | (*) | >50 | >50 |
| 36 | >2.5 | 0.6 | | (*) | (*) | (*) | (*) | | (*) | >50 | >50 |
| 37 | 8 | 0.62 | 62 | (*) | (*) | (*) | (*) | | (*) | 37.5 | >50 |
| 38 | >2.5 | 0.31 | | (*) | (*) | (*) | (*) | | (*) | 37.5 | >50 |
| 39 | >2.5 | 0.62 | | (*) | (*) | (*) | (*) | | (*) | >50 | ~25 |
| 40 | >2.5 | 1.25 | | (*) | (*) | (*) | (*) | | (*) | 50 | >50 |
| 41 | >2.5 | 0.6 | | (*) | (*) | (*) | (*) | | (*) | 50 | >50 |
| 42 | >2.5 | 0.3 | | 125 | (*) | 62.5 | 125 | | 125 | 62.5 | 37.5 | >50 |
| 43 | >2.5 | 1.25 | 125 | (*) | (*) | (*) | (*) | | (*) | >50 | >50 |
| 44 | 8 | 0.01 | 62 | (*) | (*) | (*) | (*) | | 125 | <1.5 | >50 |

[3] Indicates greater than 250.

We claim:
1. A process for producing a compound selected from the group consisting of compounds of the formula:

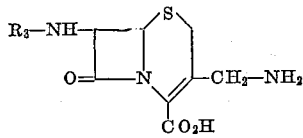

in which $R^3$ is carboxylic acyl which comprises the step of reducing a compound selected from the group consisting of compounds of the formula:

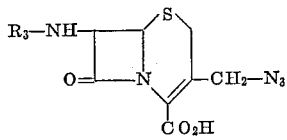

wherein $R^3$ has the meaning defined above, by catalytic hydrogenation using a precious metal catalyst selected from the group consisting of platinum and palladium.

2. A process as defined in claim 1 in which the hydrogenation is effected in the presence of a strong acid.

3. A process as defined in claim 2 in which the strong acid is perchloric acid.

4. A process as defined in claim 1 in which the hydrogenation is effected at 3–10 atmospheres.

5. A compound of the formula

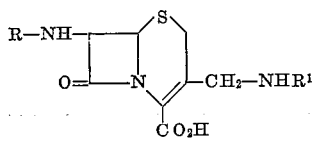

and salts thereof in which R is selected from the group consisting of
 (a) $R^2(CH_2)_nCO$— where $R^2$ is phenyl, nitrophenyl, chlorophenyl, bromophenyl, lower alkyl phenyl, lower alkoxy phenyl, cycloalkyl or thienyl, and $n$ is an integer from 1 to 4,
 (b) $R^3CO$— where $R^3$ contains from 2 to 7 carbon atoms and is alkyl, alkylthioalkyl or alkoxyalkyl,
 (c) $R^4CO$— where $R^4$ contains from 2 to 7 carbon atoms and is alkenyl, alkylthioalkenyl, alkenylthioalkyl, alkoxyalkenyl or alkenyloxyalkyl,
 (d) $R^2X(CH_2)_nCO$— where $R_2$ and $n$ are as defined above and X is oxygen or sulphur,
 (e) $R^2(CH_2)_nS(CH_2)_m CH_2CO$— where $R_2$ and $n$ are as defined above and $m$ is 0 or an integer from 1 to 4, and
 (f) $R^2CO$— where $R^2$ is as defined above,
and in which $R^1$ is hydrogen or an acyl group selected from the group consisting of
 (g) $R^5(CH_2)_nCO$— where $R_5$ is the same as $R^2$ or lower alkyl pyridyl,
 (h) $R^6CO$— where $R^6$ is the same as $R^3$ or hydrogen,
 (i) $R^4CO$— where $R^4$ is as defined above,
 (j) $R^2X(CH_2)_nCO$— where $R^2$, $n$ and X are as defined above,
 (k) $R_2(CH_2)_nS(CH_2)_mCH_2CO$— where $R_2$, $n$ and $m$ are as defined above,
 (l) $R^7CO$— where $R^7$ is the same as $R^2$, nicotinyl, isonicotinyl, quinaldinyl, quinoline-8-carbonyl, benzyloxy or lower alkoxy, and (m) 

where $R^8$ is lower alkyl phenyl, lower alkyl, phenyl or pyridyl, or is —CXNHR$^9$ where X is as defined above and $R^9$ is phenyl, cycloalkyl, lower alkoxy phenyl, lower alkenyl or lower alkyl.

6. A compuond of the formula

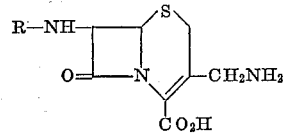

and salts thereof where R is selected from the group consisting of
 (a) $R^2(CH_2)_nCO$— where $R^2$ is phenyl, nitrophenyl, chlorophenyl, bromophenyl, lower alkyl phenyl, lower alkoxy phenyl, cycloalkyl or thienyl, and $n$ is an integer from 1 to 4,
 (b) $R^3CO$— where $R^3$ contains from 2 to 7 carbon atoms and is alkyl, alkylthioalkyl or alkoxyalkyl,
 (c) $R^4CO$— where $R^4$ contains from 2 to 7 carbon atoms and is alkenyl, alkylthioalkenyl, alkenylthioalkyl, alkoxyalkenyl or alkenyloxyalkyl,
 (d) $R^2X(CH_2)_nCO$— where $R^2$ and $n$ are as defined above and X is oxygen or sulphur,
 (e) $R^2(CH_2)_nS(CH_2)_m CH_2CO$— where $R^2$ and $n$ are as defined above and $m$ is 0 or an integer from 1 to 4, and
 (f) $R^2CO$— where $R^2$ is as defined above.

7. A compound as defined in claim 6 in which R is $R^2(CH_2)_nCO$—.

8. 3 - aminomethyl - 7 - phenylacetamidoceph - 3-em-4-oic acid.

9. 3 - aminomethyl - 7 - (s - benzylmercapto) - acetamidoceph-3-em-4-oic acid.

10. 3 - aminomethyl - 7 - n - pentanamidoceph - 3-em-4-oic acid.

11. 3 - aminomethyl - 7 - (thienyl - 2′) - acetamidoceph-3-em-4-oic acid.

12. 3 - aminomethyl - 7 - (4′ - methoxyphenyl) - acetamidoceph-3-em-4-oic acid.

13. A compound of the formula

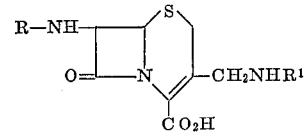

and salts thereof in which R is selected from the group consisting of
 (a) $R^2(CH_2)_nCO$— where $R^2$ is phenyl, nitrophenyl, chlorophenyl, bromophenyl, lower alkyl phenyl, lower alkoxy phenyl, cycloalkyl or thienyl, and $n$ is an integer from 1 to 4,
 (b) $R^3CO$— where $R^3$ contains from 2 to 7 carbon atoms and is alkyl, alkylthioalkyl or alkoxyalkyl,
 (c) $R^4CO$— where $R^4$ contains from 2 to 7 carbon atoms and is alkenyl, alkylthioalkenyl, alkenylthioalkyl, alkoxyalkenyl or alkenyloxyalkyl,
 (d) $R^2X(CH_2)_nCO$— where $R^2$ and $n$ are as defined above and X is oxygen or sulphur,
 (e) $R^2(CH_2)_nS(CH_2)_mCH_2CO$— where $R^2$ and $n$ are as defined above and $m$ is 0 or an integer from 1 to 4, and
 (f) $R^2CO$— where $R^2$ is as defined above,
and in which $R^1$ is an acyl group selected from the group consisting of
 (g) $R^5(CH_2)_nCO$— where $R_5$ is the same as $R^2$ or lower alkyl pyridyl,
 (h) $R^6CO$— where $R^6$ is the same as $R^3$ or hydrogen,
 (i) $R^4CO$— where $R^4$ is as defined above,
 (j) $R^2X(CH_2)_nCO$— where $R^2$, $n$ and X are as defined above,
 (k) $R^2(CH_2)_nS(CH_2)_mCH_2CO$— where $R_2$, $n$ and $m$ are as defined above, (1) R⁷CO— where R⁷ is the same as R², nicotinyl, isonicotinyl, quinaldinyl, quinoline-8-carbonyl, benzyloxy or lower alkoxy, and (m) 

where R⁸ is lower alkyl phenyl, lower alkyl, phenyl or pyridyl.

14. A compound as claimed in claim 13 in which R is R²(CH₂)ₙCO—.

15. 3 - acetamidomethyl - 7 - phenylacetamidoceph-3-em-4-oic acid.

16. 7 - phenylacetamido - 3 - phenylacetamidomethylceph-3-em-oic acid.

17. 7 - phenylacetamido - 3 - p - toluenesulphonamidomethylceph-3-em-4-oic acid.

18. A compound of the formula

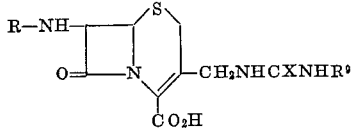

and salts thereof in which R is selected from the group consisting of (a) R²(CH₂)ₙCO— where R² is phenyl, nitrophenyl, chlorophenyl, bromophenyl, lower alkyl phenyl, lower alkoxy phenyl, cycloalkyl or thienyl, and n is an integer from 1 to 4, (b) R³CO— where R³ contains from 2 to 7 carbon atoms and is alkyl, alkylthioalkyl or alkoxyalkyl, (c) R⁴CO— where R⁴ contains from 2 to 7 carbon atoms and is alkenyl, alkylthioalkenyl, alkenylthioalkyl, alkoxyalkenyl or alkenyloxyalkyl, (d) R²X(CH₂)ₙCO— where R² and n are as defined above and X is oxygen or sulphur, (e) R²(CH₂)ₙS(CH₂)ₘCH₂CO— where R² and n are as defined above and m is 0 or an integer from 1 to 4, and (f) R²CO— where R² is as defined above, and in which X is as defined above and R⁹ is phenyl, cycloalkyl, lower alkoxy phenyl, lower alkenyl or lower alkyl.

19. 3 - n - butylthioureylenemethyl - 7 - phenylacetamidoceph-3-em-4-oic acid.

References Cited by the Examiner
UNITED STATES PATENTS 3,124,576  3/1964  Stedman _____ 260—243
3,129,224  4/1964  Collins _____ 260—243

ALEX MAZEL, *Primary Examiner.*

NICHOLAS S. RIZZO, HENRY R. JILES, *Examiners.*

J. W. ADAMS, *Assistant Examiner.*